(12) United States Patent
Endean

(10) Patent No.: US 11,333,499 B2
(45) Date of Patent: May 17, 2022

(54) VIBRATORY ERROR COMPENSATION IN A TUNING FORK GYROSCOPE SUCH AS A CORIOLIS VIBRATORY GYROSCOPE (CVG)

(71) Applicant: Honeywell International Inc., Morris Plains, NJ (US)

(72) Inventor: Daniel Endean, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 75 days.

(21) Appl. No.: 16/505,340

(22) Filed: Jul. 8, 2019

(65) Prior Publication Data

US 2020/0088518 A1 Mar. 19, 2020

Related U.S. Application Data

(60) Provisional application No. 62/731,127, filed on Sep. 14, 2018.

(51) Int. Cl.
*G01C 19/5614* (2012.01)
*G01C 19/5621* (2012.01)
*G01C 19/5684* (2012.01)

(52) U.S. Cl.
CPC ..... *G01C 19/5614* (2013.01); *G01C 19/5621* (2013.01); *G01C 19/5684* (2013.01)

(58) Field of Classification Search
CPC ........................ G01C 19/5614; G01C 19/5621
See application file for complete search history.

(56) References Cited

U.S. PATENT DOCUMENTS

| | | | |
|---|---|---|---|
| 6,860,151 B2 | 3/2005 | Platt et al. | |
| 7,886,598 B2 | 2/2011 | Wyse et al. | |
| 9,702,697 B2 | 7/2017 | Stewart et al. | |
| 2003/0131664 A1* | 7/2003 | Mochida | G01C 19/5719 73/504.12 |
| 2007/0034005 A1 | 2/2007 | Acar et al. | |
| 2007/0068756 A1 | 3/2007 | Huston et al. | |
| 2007/0227247 A1 | 10/2007 | Weber | |

(Continued)

FOREIGN PATENT DOCUMENTS

DE 102011085294 A1 5/2013
EP 1960736 B1 5/2010

(Continued)

OTHER PUBLICATIONS

Israel Patent Office, "Office Action from IL Application No. 268028", from Foreign Counterpart to U.S. Appl. No. 16/505,340, dated May 23, 2021, pp. 1 through 3, Published: IL.

(Continued)

*Primary Examiner* — Paul M. West
*Assistant Examiner* — Mark A Shabman
(74) *Attorney, Agent, or Firm* — Fogg & Powers LLC

(57) ABSTRACT

A gyroscope assembly includes a sense proof mass and a compensation proof mass. The sense proof mass has a sense frequency response in a sense dimension and is configured to move in a drive dimension in response to a drive signal, and to move in the sense dimension in response to experiencing an angular velocity about a sense input axis while moving in the drive dimension. And the compensation proof mass has, in the sense dimension, a compensation frequency response that is related to the sense frequency response.

16 Claims, 6 Drawing Sheets

(56) References Cited

U.S. PATENT DOCUMENTS

| | | |
|---|---|---|
| 2008/0001075 A1 | 1/2008 | Ascanio et al. |
| 2011/0303007 A1 | 12/2011 | Rocchi |
| 2012/0312094 A1 | 12/2012 | Uchida et al. |
| 2013/0180332 A1 | 7/2013 | Jia et al. |
| 2013/0298672 A1 | 11/2013 | Kuhlmann et al. |
| 2015/0377624 A1 | 12/2015 | Falorni et al. |
| 2016/0102978 A1 | 4/2016 | Liao et al. |
| 2018/0231090 A1 | 8/2018 | Gnerlich et al. |

FOREIGN PATENT DOCUMENTS

| | | |
|---|---|---|
| EP | 2963387 A1 | 1/2016 |
| EP | 3086089 A1 | 10/2016 |

OTHER PUBLICATIONS

European Patent Office, "Extended European Search Report from EP Application No. 19186395.0", from Foreign Counterpart to U.S. Appl. No. 16/505,340, dated Jan. 28, 2020, pp. 1-7, Published: EP.

Unker et al., "Optimum Tuning of a Gyroscopic Vibration Absorber Using Coupled Gyroscopes for Vibration Control of a Vertical Cantilever Beam", "Hindawi Publishing Corporation Shock and Vibration vol. 2016, Article ID 1496727, http://dx.doi.org/10.1155/2016/1496727", Feb. 2016, pp. 1-12, Published in: US.

Israel Patent Office, "Office Action from IL Application No. 268028", from Foreign Counterpart to U.S. Appl. No. 16/505,340, dated Oct. 4, 2021, pp. 1 through 3, Published: IL.

\* cited by examiner

VIBRATORY ERROR COMPENSATION IN A TUNING FORK GYROSCOPE SUCH AS A CORIOLIS VIBRATORY GYROSCOPE (CVG)

PRIORITY AND RELATED APPLICATIONS

This application claims benefit of priority to U.S. Provisional Patent App. 62/731,127, which is titled VIBRATORY ERROR CANCELLATION IN TUNING FORK GYROSCOPE, which was filed Sep. 14, 2018, and which is incorporated by reference.

STATEMENT REGARDING FEDERALLY SPONSORED RESEARCH OR DEVELOPMENT

This invention was made with U.S. Government support under U.S. Government Contract Number HR0011-16-9-0001 awarded by DARPA. The U.S. Government has certain rights in the invention.

SUMMARY

FIG. 1 is an isometric view of a single-sense-axis, in-plane, MEMS Coriolis Vibratory Gyroscope (CVG) 10 (also called a tuning-fork gyroscope (TFG) or an in-plane gyroscope (IPG)). "In-plane" means that the input axis 12 lies in the same plane (here the x-y plane) in which the proof masses $M_1$ and $M_2$ lie and are driven, as described below.

In response to the CVG 10, computing circuitry, other circuitry, or another device (not shown in FIG. 1, hereinafter "computing circuitry"), is configured to determine an angular velocity $\vec{\Omega}(t)$ of a vehicle or other system (e.g., a missile) about a sense axis of rotation, hereinafter an input axis 12 of rotation (the y axis in this example), where $\vec{\Omega}(t)$ is a vector having a direction that is aligned with the input axis of rotation. $\vec{\Omega}(t)$ follows the right-hand-rule convention. That is, $\vec{\Omega}(t)$ points downward (i.e., is negative) along the input axis 12 while the rotation that gives rise to $\vec{\Omega}(t)$ is in the clockwise direction, and points upward (i.e., is positive) along the input axis while the rotation is in the counter-clockwise direction.

From the determined angular velocity $\vec{\Omega}(t)$, the computing circuitry (not shown in FIG. 1) is configured to determine, e.g., the angular acceleration, the angular position, and a change in angular position, of the system about the input axis 12 of rotation. For example, if the system rotates about the input axis 12 from a desired angular position to an undesired angular position, then the computing circuitry, in response to the angular velocity $\vec{\Omega}(t)$ sensed by the MEMS CVG 10, can determine the undesired change in the system's angular position about the input axis, and, therefore, can correct the system's angular position by causing the system to rotate about the input axis in a reverse direction back to the desired positon. Or, if the system is controlled to rotate about the input axis 12 from a starting position to a new position, then the computing circuitry, in response to the determined angular velocity $\vec{\Omega}(t)$, can determine when the system is approaching the new position and can cause the system to stop rotating once the system attains the new position.

A subsystem or a system, such as a navigation subsystem or a vehicle system, can include multiple MEMS CVGs. For example, a subsystem or a system can include three single-axis MEMS CVGs, one for each of the x, y, and z axes of the system.

Still referring to FIG. 1, the in-plane MEMS CVG 10 is configured to generate a signal from which computer circuitry can derive the angular velocity $\vec{\Omega}(t)$ by making use of the Coriolis acceleration.

The MEMS CVG 10 includes two or more masses M (hereinafter "proof masses"), which are disposed approximately equidistant from, and approximately parallel to, the input axis 12 of rotation, and which each have approximately the same mass m. For purposes of example, it is assumed hereinafter that the MEMS CVG 10 includes only two proof masses $M_1$ and $M_2$.

A velocity-drive assembly (not shown in FIG. 1) is configured to drive each proof mass $M_1$ and $M_2$ with respective velocities of approximately equal magnitude and approximately opposite phase (e.g., magnitudes that are within ±1% of one another and phases that are within 180°±1% of one another). For example, the velocity-drive assembly is configured to drive the proof mass $M_1$=m back and forth along the x axis in the x-y (z=0) plane at a sinusoidal velocity $-\vec{V}(t)$, and is configured to drive the mass $M_2$=m back and forth in the x axis in the x-y (z=0) plane at a sinusoidal velocity $\vec{V}(t)$, which, ideally, has the same amplitude as $-\vec{V}(t)$ but is 180° out of phase with $-\vec{V}(t)$. That is, ideally, $M_1$ and $M_2$ move toward one another during first half cycles of $-\vec{V}(t)$ and $\vec{V}(t)$, and move away from each other during second half cycles of $-\vec{V}(t)$ and $\vec{V}(t)$. The velocity-drive assembly can include, for example, an electrostatic or an inductive/magnetic driver circuit, and can include a mechanical assembly, such as a network of flexures such as springs, that is attached to the proof masses $M_1$ and $M_2$. The combination of the proof masses $M_1$ and $M_2$ and the mechanical assembly can form a second order system having a resonant frequency such that in operation, the velocity-drive assembly causes the proof masses $M_1$ and $M_2$ to resonate back and forth at the respective velocities $-\vec{V}(t)$ and $\vec{V}(t)$; that is, the sinusoidal frequency $F_v$ at which the velocity-drive assembly drives the proof masses $M_1$ and $M_2$ is approximately the resonant frequency of the proof-mass assembly. The MEMS CVG 10 also can include one or more sensors (e.g., capacitive sensors, magnetic/inductive sensors) that generate respective signals from which the velocities $-\vec{V}(t)$ and $\vec{V}(t)$ of the proof masses $M_1$ and $M_2$ can be determined; as described below, one or both of these signals can be used to demodulate, or otherwise frequency shift, the sense signal(s) from which computing circuitry derives $\vec{\Omega}(t)$.

A rotation about the y input axis 12 of the MEMS CVG 10 can be quantified as an angular velocity $\vec{\Omega}(t)$ about the input axis, where $\vec{\Omega}(t)$ can have an arbitrary phase, arbitrary frequency, and arbitrary magnitude relative to $-\vec{V}(t)$ and $\vec{V}(t)$.

In response to the experienced angular velocity $\vec{\Omega}(t)$, the proof masses $M_1$ and $M_2$ experience respective Coriolis accelerations $-a_c(t)$ and $a_c(t)$ in the z dimension according to the following equations:

$$\vec{a}_c(t) = 2(\vec{V}(t) \times \vec{\Omega}(t)) \quad (1)$$

$$-\vec{a}_c(t)=2(-\vec{V}(t)\times\vec{\Omega}(t)) \quad (2)$$

where "X" is the vector cross-product operator. The MEMS CVG 10 can include respective deflection sensors (e.g., capacitance deflection sensors, magnetic/inductive deflection sensors) to measure (e.g., by generating respective sense signals) the respective z-dimension deflections of the proof masses $M_1$ and $M_2$, where the second derivatives of the deflections are respectively proportional to the Coriolis accelerations $-\vec{a}_c(t)$ and $\vec{a}d_c(t)$. After determining $-\vec{a}_c(t)$ and $\vec{a}_c(t)$, and because $-\vec{V}(t)$ and $\vec{V}(t)$ can be measured, and are, therefore, known, computing circuitry (not shown in FIG. 1) that is part of, or that is coupled to, the MEMS CVG 10 can solve for $\vec{\Omega}(t)$ from equation (1), from equation (2), or from both equations (1) and (2). For example, the computing circuitry can average the respective values of $\vec{\Omega}(t)$ obtained from equations (1) and (2) to increase the signal-to-noise ratio (SNR) of the resulting value of $\vec{\Omega}(t)$.

For example, if $\vec{\Omega}(t)$ is constant and $-\vec{V}(t)$ and $\vec{V}(t)$ are sinusoids of equal magnitude and opposite phase, then the deflection sensors effectively sense and generate, at a phase $P_v$ and a frequency $F_v$ of $-\vec{V}(t)$ and $\vec{V}(t)$, two carrier waves that are respectively amplitude modulated by the z-dimension deflection magnitudes of the proof masses $M_1$ and $M_2$. For example, if $\vec{V}(t)$ has a frequency of $F_v$=100 KHz, then the signal generated by the deflection sensor for $M_2$ is a sinusoid having a frequency $F_v$ of 100 KHz and an amplitude that is proportional to the sense-dimension (here the z-dimension) deflection magnitude of $M_2$, and, therefore, that is proportional to the magnitudes of $\vec{a}_c(t)$ and $\vec{\Omega}(t)$.

For the measurement of $\vec{\Omega}(t)$ in response to the z-dimension deflections of one or both of the sense proof masses $M_1$ and $M_2$ to be accurate, the one or both of $M_1$ and $M_2$ ideally exhibit zero deflection in the z dimension while $\vec{\Omega}(t)=0$ regardless of its/their respective position(s) in the x dimension. Furthermore, $M_1$ and $M_2$ are moved in opposite directions, with equal-but-opposite velocities, because if there is motion in the z dimension (common-mode motion), which is typically a result of vibration and mechanical shock experienced by the system that includes the MEMS CVG 10, the z-dimension sensor(s) will reject this motion since the readout is implemented differentially (i.e., only movement when one mass M moves differently than the other mass M in the z dimension is interpreted as a Coriolis acceleration).

FIG. 2 is a diagram of a MEMS CVG 20, which is similar to the MEMS CVG 10 of FIG. 1, but which has an out-of-plane (OP) configuration, meaning that an input axis 22 is substantially perpendicular, not substantially parallel, to the plane (here the x-y plane) in which the sense proof masses $M_1$ and $M_2$ move back and forth. That is, unlike the in-plane input axis 12 of the MEMS CVG 10, which input axis is parallel to, or coincident with, the y axis, the out-of-plane input axis 22 of the MEMS CVG 20 is parallel to, or coincident with, the z axis. Although the below description refers to the out-of-plane MEMS CVG 20 of FIG. 2, the principles described also apply to in-plane MEMS CVGs such as the in-plane MEMS CVG 10 of FIG. 1.

Despite the above-described design considerations for producing a sensor sensitive to only rotational motion, the MEMS CVG 20 is still susceptible to an effective bias rotational velocity coat about the input axis 22. In this case, $\omega_{AC}$ is an oscillatory rotational (or translational) motion near the resonant frequency of the MEMS CVG 20. For example, vibrations induced by the external environment can contribute to $\omega_{AC}$. In another example, $\omega_{AC}$ is not a sinusoidal rotational velocity but a sinusoidal translation velocity, meaning that an unwanted translational vibration induces an unwanted rotational or translational velocity about the input axis 22.

These unwanted vibrations may not cause an actual measurable rotation of the MEMS CVG 20 about the input axis 22. For example, these vibration-induced rotations about the input axis 22 may be outside of the bandwidth measureable by a sensor via the Coriolis acceleration, or may be outside of the bandwidth of the circuitry that generates, conditions, and measures the corresponding sensor signal. Instead, as is explained below, these vibrations may cause unwanted motion of the proof masses in the MEMS CVG 20. That is, $\omega_{AC}$ represents a virtual bias rotational velocity that the unwanted vibrations can be modeled as inducing about the input axis 22, even though the unwanted vibrations, in actuality, induce only movement of the proof masses in the sense dimensions.

As stated, even though these unwanted vibrations may not cause a measureable Coriolis response in the MEMS CVG 20 about the input axis 22, these vibrations actually do cause the proof masses $M_1$ and $M_2$ to move in the sense dimension (the y dimension in FIG. 2) such that these sense-dimension movements introduce unwanted bias into the sense signals that, without the bias, would represent the Coriolis accelerations $\vec{a}_c(t)$ and $-\vec{a}_c(t)$ of equations (1) and (2) above. Said another way, vibrations may induce movements of the proof masses $M_1$ and $M_2$ in the sense dimension (the y dimension in FIG. 2), and the measurement circuitry may interpret, incorrectly, these movements as movements due to the Coriolis acceleration caused by an angular velocity about the input axis 22. These vibration-induced movements of the proof masses $M_1$ and $M_2$ in the sense dimension are called, therefore, unwanted-vibration bias, or just bias, and this bias introduces an error into the measured angular velocity. With this unwanted-vibration bias, quantities $S_1(t)$ and $S_2(t)$, which represent the second derivatives of the sense signals that circuitry generates in response to the movements of the proof masses $M_1$ and $M_2$, respectively, in the sense dimension (the y dimension in FIG. 2), are given by the following equations:

$$S_1(t)=[-\vec{a}_c(t)=2(-\vec{V}(t)\times\vec{\Omega}t)]-M_{1\_Bias}(t) \quad (3)$$

$$S_2(t)=[\vec{a}_c(t)=2(\vec{V}(t)\times\vec{\Omega}(t)]+M_{2\_Bias}(t) \quad (4)$$

where $M_{1\_Bias}(t)$ represents the second derivative with respect to time of the vibration-induced movement of the proof mass $M_1$ in the sense dimension, and where $M_{2\_Bias}(t)$ represents the second derivative with respect to time of the vibration-induced movement of the proof mass $M_2$ in the sense dimension.

In another example, $M_{1\_Bias}(t)$ and $M_{2\_Bias}(t)$ could be the result of translational or rotational motion of the proof masses $M_1$ and $M_2$, respectively, in a dimension different from the sense dimension at a resonant frequency of the MEMS CVG 20.

If an imperfection or aspect of the design of the MEMS CVG 20 makes the MEMS CVG sensitive to these translational or rotational motions, then the design may produce sinusoidal bias signals $M_{1\_Bias}(t)$ and $M_{2\_Bias}(t)$ in $S_1(t)$ and $S_2(t)$ per equations (3) and (4), respectively. In these examples, $S_1(t)$ is the second derivative of the position in the y dimension of the proof mass $M_1$ versus time, $M_{1\_Bias}(t)$ is the bias component of $S_1(t)$ caused by $\omega_{AC}(t)$ (i.e., caused by the unwanted non-$\vec{\Omega}(t)$-induced movement of the proof mass $M_1$ in the y (sense) dimension), $S_2(t)$ is the second derivative of the position in the y dimension of the proof mass $M_2$ versus time, and $M_{2\_Bias}(t)$ is the bias component of $S_2(t)$ caused by $\omega_{AC}(t)$ (i.e., caused by the unwanted non-$\vec{\Omega}(t)$-induced movement of the proof mass $M_2$ in the y (sense) dimension).

Therefore, a need has arisen for a gyroscope assembly that is configured to compensate for (e.g., to reduce or to eliminate the magnitudes of) the bias components $M_{1\_Bias}(t)$ and $M_{2\_Bias}(t)$ of equations (3) and (4).

An apparatus, such as gyroscope assembly, that can meet such a need includes at least one sense proof mass and at least one corresponding compensation proof mass. Each of the at least one sense proof mass has a sense frequency response in a sense dimension and is configured to move in a drive dimension in response to a drive signal, and to move in the sense dimension in response to experiencing an angular velocity about a sense input axis while moving in the drive dimension. And each of the at least one compensation proof mass has, in the sense dimension, a compensation frequency response that is related to the sense frequency response. For example, if, in the sense dimension, the frequency responses of a sense proof mass and a corresponding compensation proof mass are matched, then the sense proof mass and the compensation proof mass can be designed to produce bias components that are approximately equal to one another. By subtracting the bias component generated in response to the compensation proof mass from the sense signal generated in response to the sense proof mass, the bias components $M_{1\_Bias}(t)$ and $M_{2\_Bias}(t)$ of equations (3) and (4) are reduced or eliminated (e.g., cancelled) such that circuitry can determine the angular velocity $\vec{\Omega}(t)$ with reduced bias error as compared to a gyroscope assembly that does not include a compensation proof mass.

DETAILED DESCRIPTION

"Approximately," "substantially," and similar words, as used herein, indicate that a given quantity b can be within a range b±10% of b, or b±1 if |10% of b|<1. "Approximately," "substantially," and similar words, as used herein, also indicate that a range |b-c| can be from |b−0.10|(c-b)| to |c+0.10|(c-b)||. Regarding the degree to which one item is parallel to or perpendicular to another item, "approximately," "substantially," and similar words, as used herein, indicate that a difference between a parallel orientation and an actual orientation does not exceed ±20°, and that a difference between a perpendicular, or normal, orientation and an actual orientation does not exceed ±20°.

Figure 3:
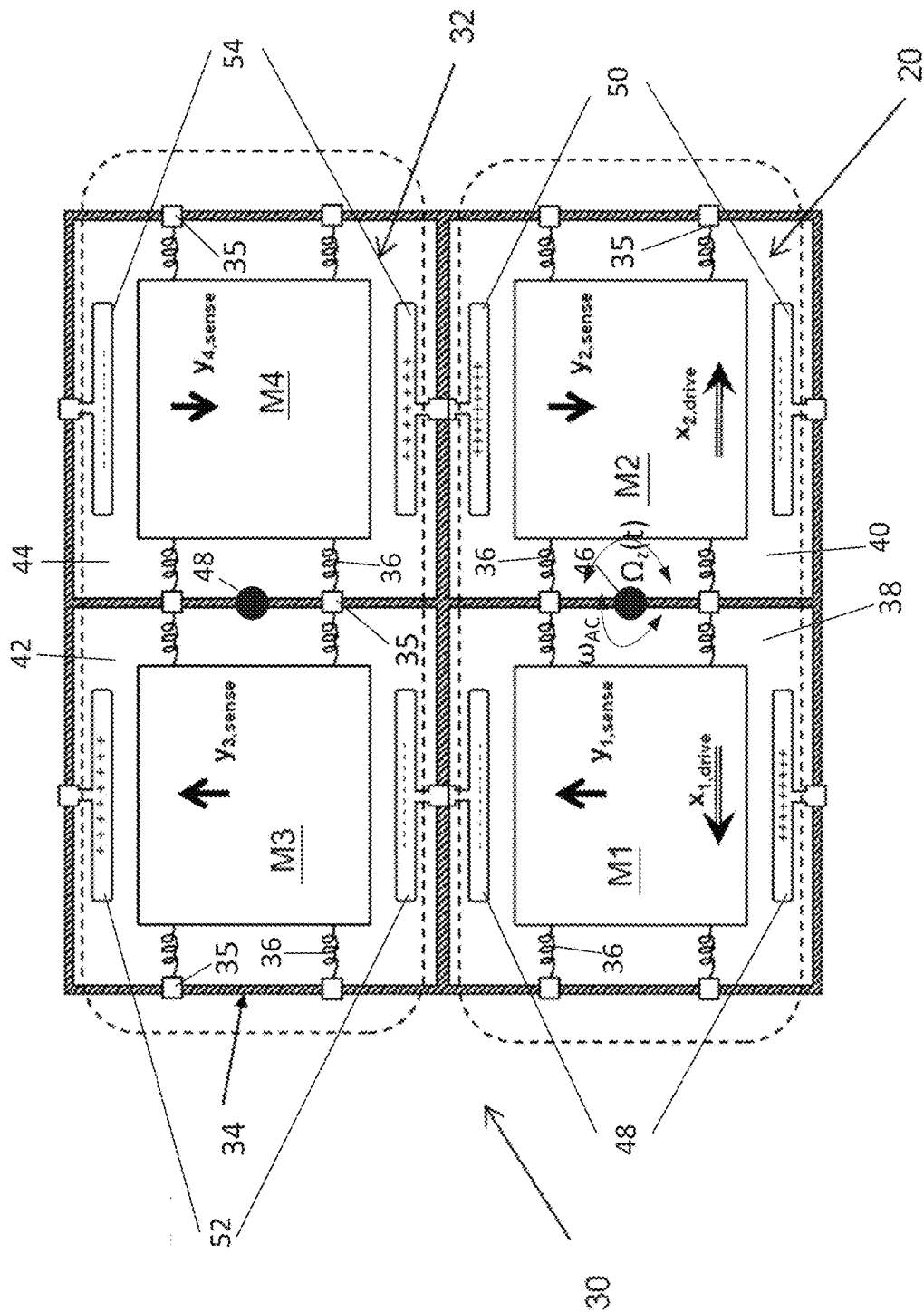
FIG. 3 is a plan view of a gyroscope assembly that includes an out-of-plane MEMS CVG and an out-of-plane MEMS bias-error compensator, according to an embodiment.

FIG. 3 is a diagram of a MEMS CVG assembly 30, which is configured to compensate for $M_{1\_Bias}(t)$ and $M_{2\_Bias}(t)$ by allowing circuitry (not shown in FIG. 3) effectively to reduce or to cancel $M_{1\_Bias}(t)$ and $M_{2\_Bias}(t)$ in equations (3) and (4), respectively, according to an embodiment.

Figure 1:
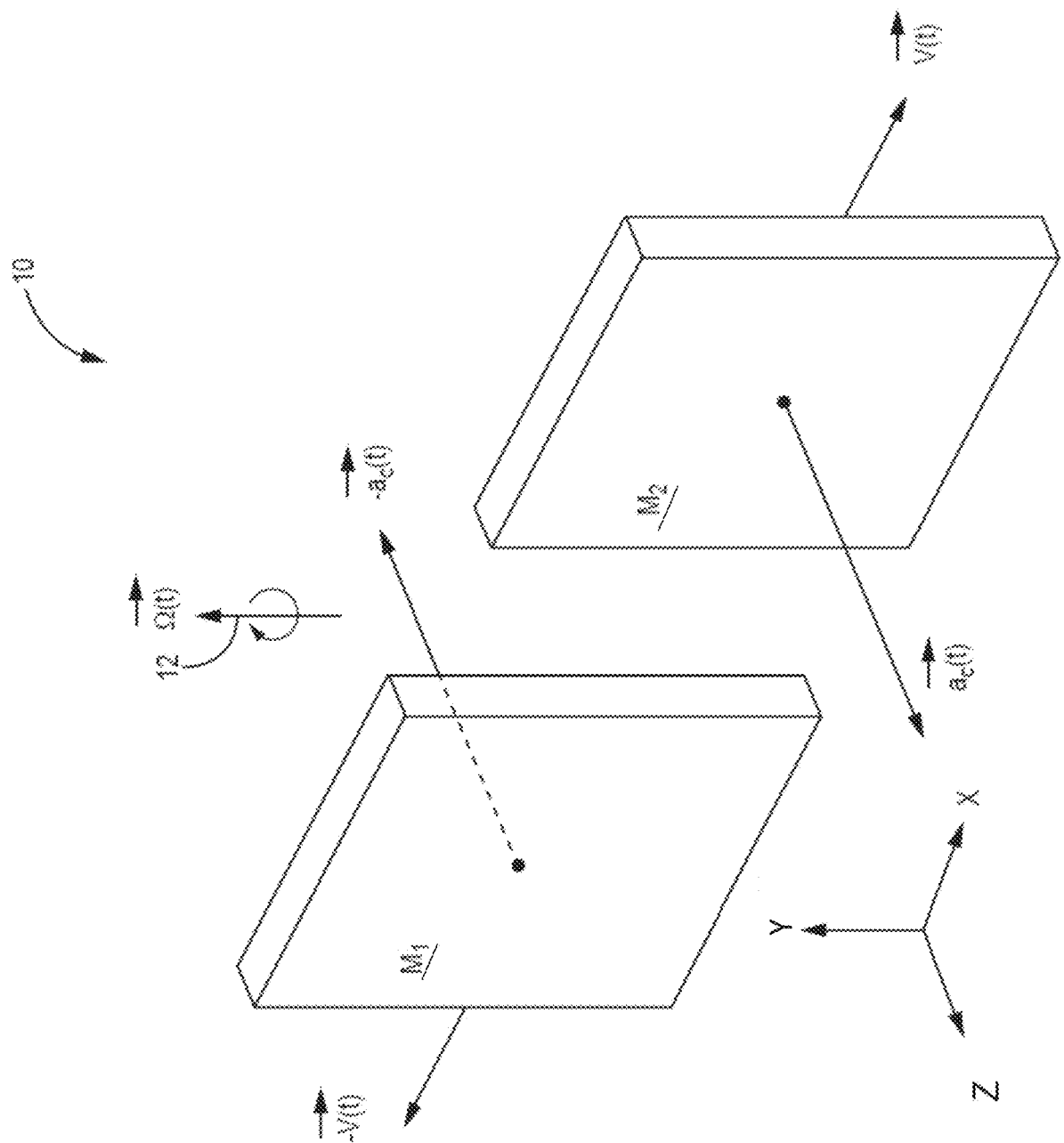
FIG. 1 is an isometric view of an in-plane MEMS Coriolis Vibratory Gyroscope (CVG).
Figure 2:
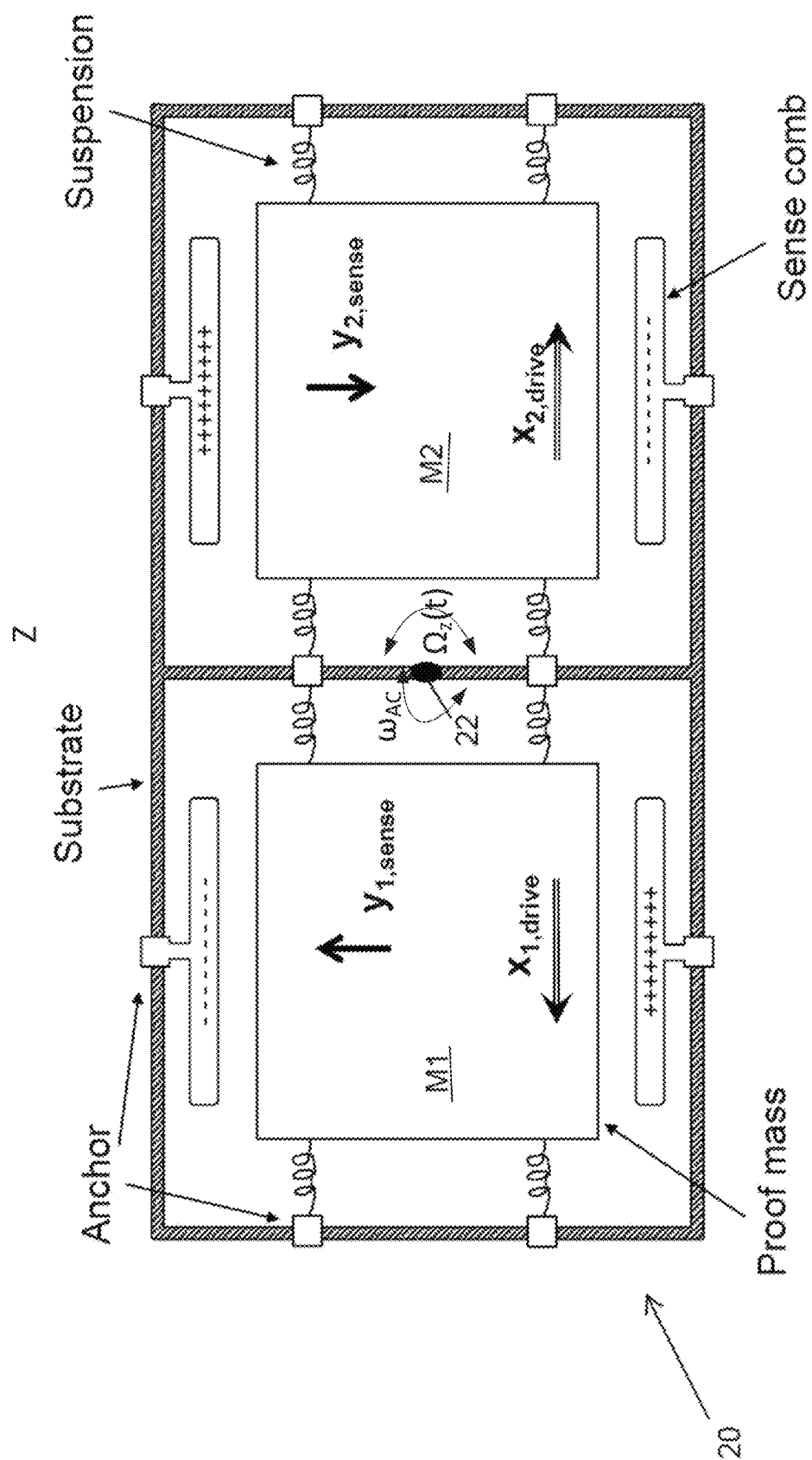
FIG. 2 is a plan view of an out-of-plane MEMS CVG.

In addition to the MEMS CVG 20 of FIG. 2, the gyroscope assembly 30 includes a probe, or compensation, MEMS CVG 32, which generates one or more probe, or compensation, signals, according to an embodiment.

The compensation CVG 32 is structurally matched to the angular-velocity-sense CVG 20 such that the compensation proof mass $M_3$ of the compensation CVG has approximately the same resonant-frequency response as the sense proof mass $M_1$ of the CVG 20 in at least the sense (here the y) dimension, and such that the compensation proof mass $M_4$ of the compensation CVG has approximately the same resonant-frequency response as the sense proof mass $M_2$ of the CVG 20 in at least the sense (here the y) dimension. Therefore, in response to a simultaneous mechanical stimulus in the y dimension, both the sense proof mass $M_1$ and the compensation proof mass $M_3$ are configured to vibrate at approximately the same frequency and phase in at least the sense (here the y) dimension, although the amplitude of the vibration of the sense proof mass $M_1$ in the sense dimension may be related to the amplitude of the vibration of compensation proof mass $M_3$ in the sense dimension by a non-unity scalar value c. Similarly, in response to a simultaneous mechanical stimulus in the y dimension, both the sense proof mass $M_2$ and the compensation proof mass $M_4$ are configured to vibrate at approximately the same frequency and phase in at least the sense dimension, although the amplitude of the vibration of the sense proof mass $M_2$ in the sense dimension may be related to the amplitude of the vibration of the compensation proof mass $M_4$ in the sense dimension by a non-unity scalar value d, where c=d or c≠d. Furthermore, the below-described operation of the CVG assembly 30 is independent of whether the compensation proof mass $M_3$ has approximately the same frequency response as the sense proof mass $M_1$ in the non-sense dimensions (here the x and z dimensions), and is independent of whether the compensation proof mass $M_4$ has approximately the same frequency response as the sense proof mass $M_2$ in the non-sense dimensions.

In more detail, the proof masses $M_1$-$M_4$ are coupled to a frame or substrate 34 via substrate anchors 35 and flexible members, such as springs, 36 such that in a steady state in which the gyroscope assembly 30 experiences no external forces, the proof masses are at rest.

The sense CVG 20 includes, in the z-dimension, a sense input axis 46 about which the CVG 20 is configured to sense an angular velocity $\vec{\Omega}_z(t)$.

And the compensation CVG 32 includes, in the z-dimension, a compensation input axis 48, which, in an embodiment, is approximately parallel to the sense input axis 46.

Capacitive (sometimes called electrostatic) pick-off combs or plates 48 and 50 are configured to generate the respective sense signals $S_1(t)$ and $S_2(t)$ of equations (3) and (4) in response to movements of the sense proof masses $M_1$ and $M_2$, respectively, in the sense (y) dimension.

And capacitive (sometimes called electrostatic) pick-off combs or plates 52 and 54 are configured to generate respective compensation signals $S_3(t)$ and $S_4(t)$ of equations (5) and (6) below in response to movements of the compensation proof masses $M_3$ and $M_4$, respectively, in the sense (y) dimension.

Capacitive (sometimes called electrostatic) drive electrodes, combs or plates, which are omitted from FIG. 3, are configured to cause the sense proof masses $M_1$ and $M_2$ to oscillate sinusoidally in the x dimension at a frequency $F_v$ and at a velocity V(t) in response to a drive signal (also called a drive waveform), the generation of which is further described below in conjunction with FIG. 7.

Still referring to FIG. 3, in operation of the MEMS gyroscope assembly 30, although the sense proof masses $M_1$ and $M_2$ are driven at velocities $-\vec{V}(t)$ and $\vec{V}(t)$, respectively, in the x dimension as described above, the compensation proof masses $M_3$ and $M_4$ are not so driven.

Therefore, while the gyroscope assembly 30 experiences unwanted induced-vibration bias as described above, the compensation signals $S_3(t)$ and $S_4(t)$, which circuitry generates in response to sense-dimension movement of the compensation proof masses $M_3$ and $M_4$, are given by the following equations:

$$S_3(t) = -M_{3\_Bias}(t) \quad (5)$$

$$S_4(t) = M_{4\_Bias}(t) \quad (6)$$

where $S_3(t)$ is the second derivative of the position in the sense (here the y) dimension of the compensation proof mass $M_3$ versus time, $-M_{3\_Bias}(t)$ is the bias component of $S_3(t)$ caused by $\omega_{AC}(t)$ (i.e., caused by the unwanted non-$\vec{\Omega}(t)$-induced movement of the proof mass $M_3$ in the sense (y) dimension), $S_4(t)$ is the second derivative of the position in the sense (here the y) dimension of the compensation proof mass $M_4$ versus time, and $M_{4\_Bias}(t)$ is the bias component of $S_4(t)$ caused by $\omega_{AC}(t)$ (i.e., caused by the unwanted non-$\vec{\Omega}(t)$-induced movement of the proof mass $M_4$ in the sense (y) dimension). And because the compensation proof masses $M_3$ and $M_4$ are not driven in the x dimension, the sense signals $S_3(t)$ and $S_4(t)$, at least ideally, each lack a Coriolis-acceleration component, and, therefore, at least ideally, include no components that represent an actual angular velocity experienced by the compensation CVG 32 about the sense input axis 46 or about the compensation input axis 48.

Because, as described above, the sense(y)-dimension resonant responses of $M_1$ and $M_3$ are approximately equal but for a scale factor, as are the sense (y)-dimension resonant responses of $M_2$ and $M_4$, and because the compensation input axis 48 is approximately parallel to the sense input axis 46, $M_{1\_Bias}(t)$ is related to $M_{3\_Bias}(t)$, and $M_{2\_Bias}(t)$ is related to $M_{4\_Bias}(t)$, according to the following equations:

$$-M_{1\_Bias}(t) \approx c \cdot M_{3\_Bias}(t) = -c \cdot S_3(t) \quad (7)$$

$$M_{2\_Bias}(t) \approx d \cdot M_{4\_Bias}(t) = d \cdot S_4(t) \quad (8)$$

where c and d are scalars as described above (one or both of c and d can equal 1).

Described another way, because the sense CVG gyroscope 20 is matched to the compensation CVG gyroscope 32 as described above, vibrations generate, about both the input axes 46 and 48, a same (or mathematically related) bias angular velocity $\omega_{AC}$ such that circuitry (not shown in FIG. 3) effectively can subtract the bias angular velocity (possibly scaled) about the compensation input axis 48 from the sense angular velocity about the sense input axis 46 to obtain the true angular velocity $\vec{\Omega}_z(t)$ about the sense input axis 46.

Therefore, subtracting $-c \cdot S_3(t)$ from $S_1(t)$ in equation (3) yields, at least approximately, $-d_c(t) = 2(-\vec{V}(t) \times \vec{\Omega}_z(t))$, subtracting $d \cdot S_4(t)$ from $S_2(t)$ in equation (4) yields, at least approximately, $\vec{a}_c(t) = 2(\vec{V}(t) \times \vec{\Omega}_z(t))$, and circuitry (not shown in FIG. 3) is configured to determine $\vec{\Omega}_z(t)$ from one or both of these two equations with at least two known values $\vec{V}(t)$ or $-\vec{V}(t)$ and $\vec{a}_c(t)$ or $-\vec{a}_c(t)$ (the values left after the subtraction) and one unknown value $\vec{\Omega}_z(t)$.

Still referring to FIG. 3, alternate embodiments of the CVG assembly 30 are contemplated. For example, instead of having an out-of-plane configuration, the CVG assembly can have an in-plane configuration in which both the sense and compensation gyroscopes 20 and 32 are in-plane gyroscopes. Furthermore, the proof masses $M_1$ and $M_3$ may or may not have the same mass, and the proof masses $M_2$ and $M_4$ may or may not have the same mass, although the masses of $M_1$ and $M_2$ are approximately equal as are the masses of $M_3$ and $M_4$. Moreover, although described as being 10 KHz, the drive frequency $F_v$ can be within an approximate range spanning from below 100 Hz to ones to tens of MHz, and even higher for optical gyroscopes, which can implement the same bias-reduction techniques described herein. In addition, although the scalar multipliers c and d are described as compensating for gain mismatches between the sense and compensation gyroscopes 20 and 32, c and d can also compensate for a distance between the sense and compensation gyroscopes. Furthermore, although described as being scalar values, c and d can be complex values that compensate not only for frequency-response gain mismatches between the sense and compensation gyroscopes 20 and 32, but also for frequency-response phase mismatches between the sense and compensation gyroscopes; for example, a frequency-response phase mismatch may result in a resonant peak of the sense gyroscope 20 being shifted in frequency (e.g., by 10 Hz or less) relative to the resonant peak of the compensation gyroscope 32. Moreover, the scalar multipliers c and d can be set equal to unity (or to another same value) if the vibration gain, in the sense dimension, of the sense gyroscope 20 is within, for example, approximately 10% of the vibration gain, in the sense dimension of the compensation gyroscope 32. In addition, although described as capacitive pick-off combs or plates, the sensors 48, 50, 52, and 54 can be other types of sensors, such as magnetic or inductive sensors. Furthermore, although described as being a capacitive pick-off comb or plate drive, the drive-(here x)-dimension drive (not shown in FIG. 3) can be another type of drive such as a magnetic or inductive drive. Moreover, embodiments described in conjunction with FIGS. 1-2 and 4-8 may be applicable to the CVG assembly 30.

FIGS. 4A-6B are diagrams of different spatial arrangements of the sense CVG 20 and the compensation CVG 32 of the gyroscope assembly 30 of FIG. 3, according to respective embodiments.

In general, the sense and compensation CVGs 20 and 32 can have any arrangement as long as their input axes 46 and 48 (FIG. 3) are approximately collinear with, or are at least approximately parallel to, one another, and the sense and compensation CVGs are sufficiently spatially close to one another such that the compensation CVG experiences approximately the same unwanted vibratory excitation as the sense CVG. For example, "approximately the same unwanted vibratory excitation" can mean that, for a given stimulus, the magnitude of the unwanted vibratory excitation that the compensation CVG 32 experiences is within approximately ±10% of the magnitude of the unwanted vibratory excitation that the sense CVG 20 experiences.

Figure 4A:
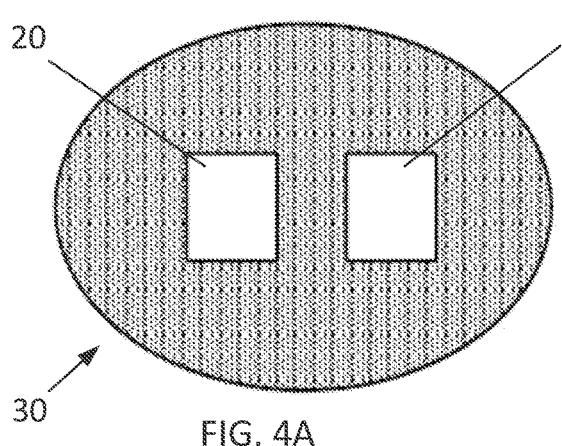
FIGS. 4A and 4B are plan and side views, respectively, of the gyroscope assembly of FIG. 3, according to an embodiment.
Figure 4B:
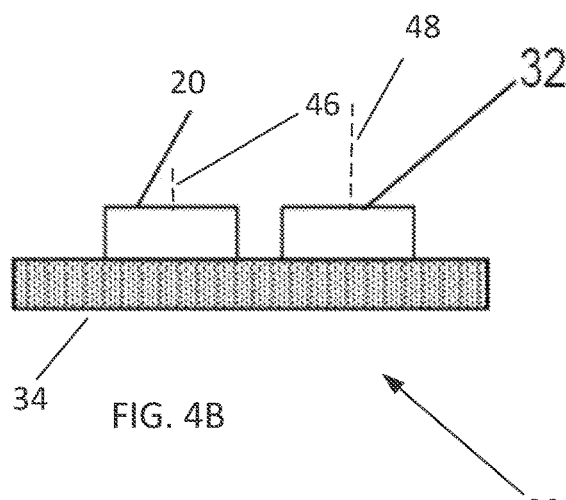

For example, FIGS. 4A and 4B are plan and side views, respectively, of a configuration of the CVG assembly 30 in which the sense CVG 20 and the compensation CVG 32 are arranged side-by-side over a same side of the substrate 34 such that the compensation and sense axes 46 and 48 are approximately parallel to one another.

Figure 5A:
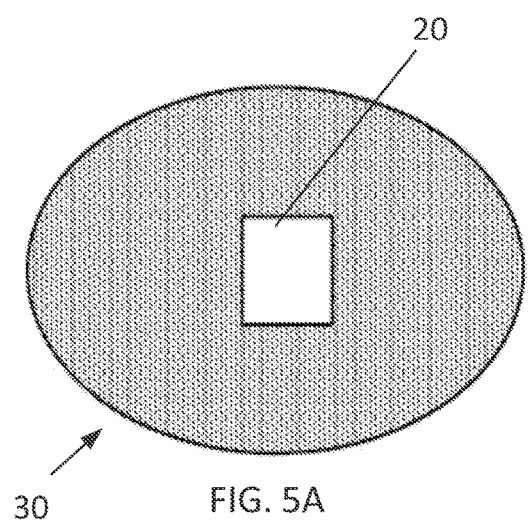
FIGS. 5A and 5B are plan and side views, respectively, of a gyroscope assembly in which the CVG and the bias-error compensator are vertically aligned on opposite sides of a substrate or other mounting platform, according to an embodiment.
Figure 5B:
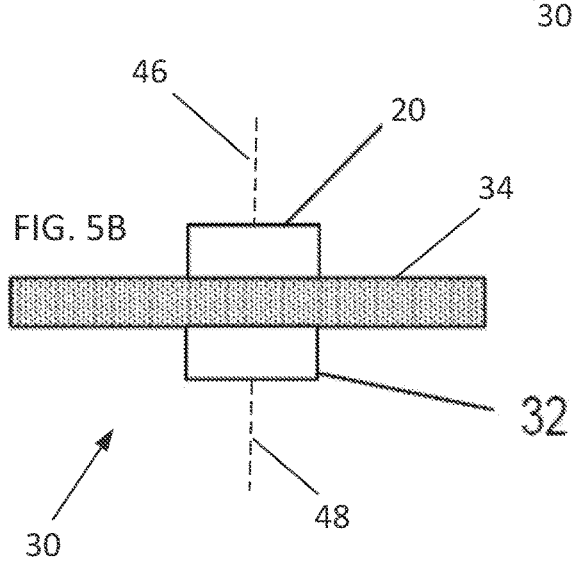

FIGS. 5A and 5B are plan and side views, respectively, of a configuration of the CVG assembly 30 in which the sense CVG 20 and the compensation CVG 32 are stacked one over the another on different sides of the substrate 34 such that the compensation and sense axes 46 and 48 are approximately collinear with one another (the compensation and sense axes need not be collinear as long as they are approximately parallel to one another).

Figure 6A:
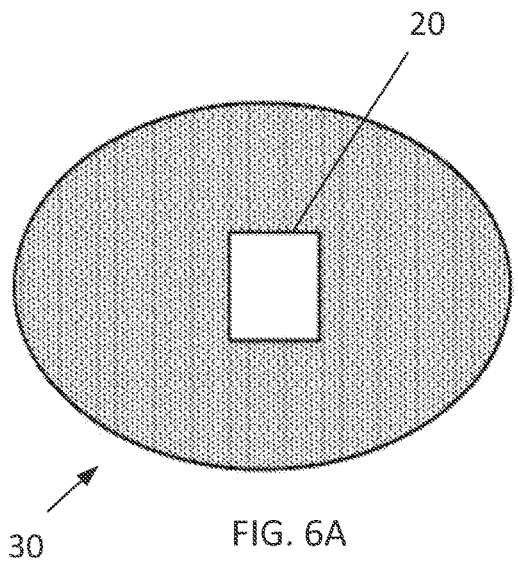
FIGS. 6A and 6B are plan and side views, respectively, of a gyroscope assembly in which the CVG and the bias-error compensator are vertically aligned on a same side of a substrate or other mounting platform, according to an embodiment.
Figure 6B:
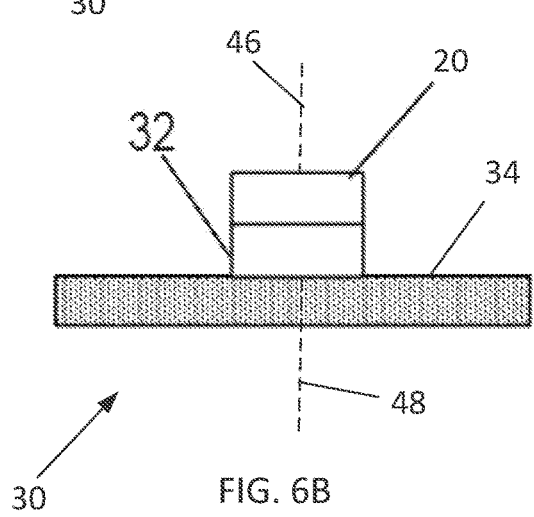

And FIGS. 6A and 6B are plan and side views, respectively, of a configuration of the CVG assembly 30 in which the sense CVG 20 and the compensation CVG 32 are stacked one over the other on a same side of the substrate 34 such that the compensation and sense axes 46 and 48 are approximately collinear with one another (the compensation and sense axes need not be collinear as long as they are approximately parallel to one another).

Still referring to FIGS. 3-6B, alternate embodiments of the CVG assembly 30 are contemplated. For example, in FIGS. 5A-6B, the compensation CVG 32 can be disposed above, instead of below, the sense CVG 20. More generally, the compensation gyroscope 32 can be translated in one or more of the x, y, and z dimensions, and be rotated about the input axis 48 in any orientation, relative to the position and orientation, respectively, of the sense gyroscope 20, as long as the input axes 46 and 48 are approximately parallel to one another, and as long as the sense and compensation gyroscopes are not too far apart, as described above. If, however, the sense and compensation gyroscopes 20 and 32 each include only a respective single proof mass (e.g., proof masses $M_1$ and $M_3$), then the orientations of the proof masses (e.g., proof masses) $M_1$ and $M_3$ are be such that the sense dimensions of the sense and compensation gyroscopes are approximately parallel to one another. Furthermore, embodiments described in conjunction with FIGS. 1-3 and 7-8 may be applicable to the gyroscope assembly 30 of FIGS. 4A-6B.

Figure 7:
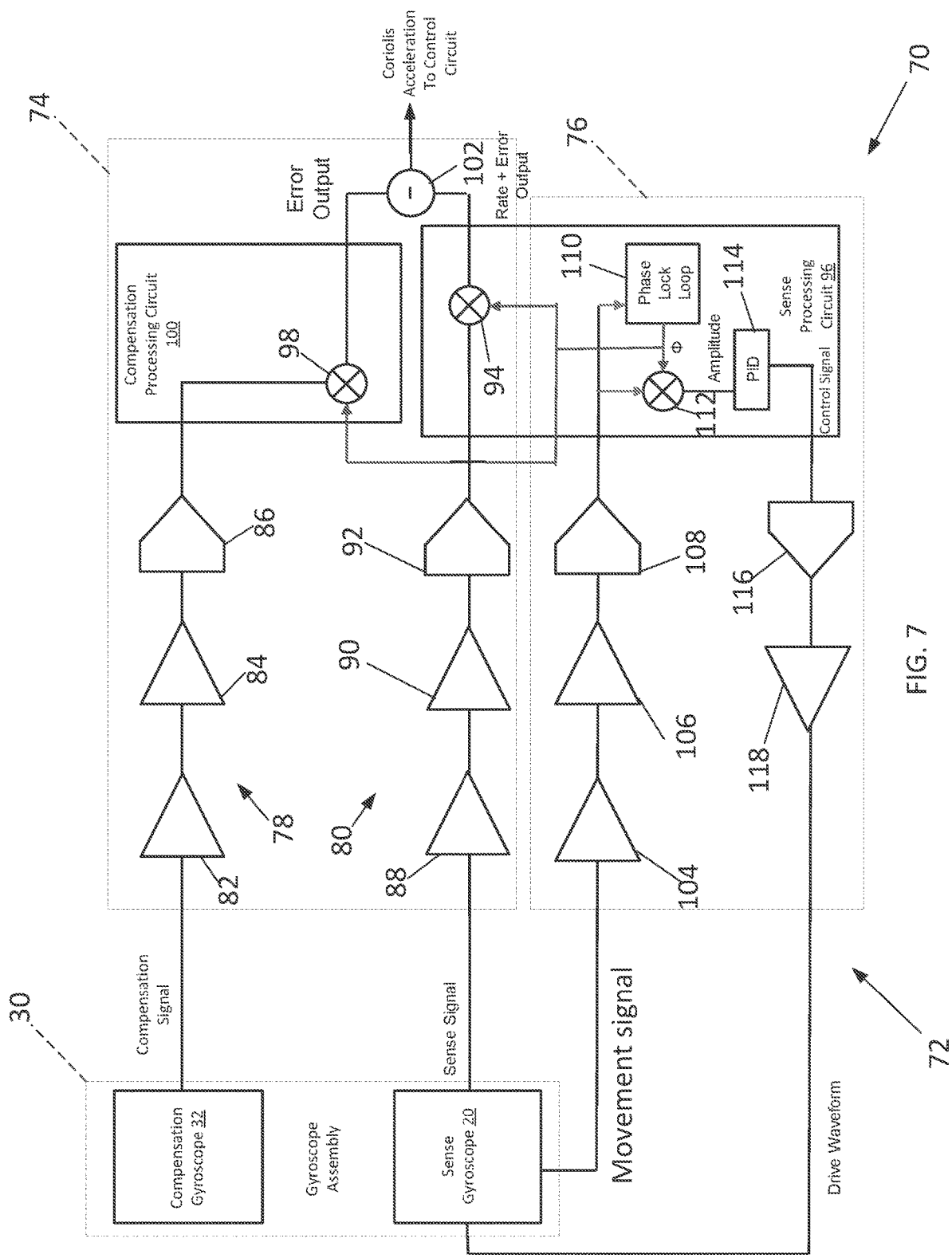
FIG. 7 is a schematic diagram of a gyroscope unit that includes a gyroscope assembly of one of FIGS. 3-6B and circuitry configured to drive the CVG and to generate a compensated signal that represents a Coriolis acceleration sensed by the CVG, according to an embodiment.

FIG. 7 is a diagram of gyroscope unit 70, which includes a gyroscope assembly 30 according to one or more of FIGS. 3-6B and includes gyroscope circuitry 72, according to an embodiment.

The gyroscope circuitry 72 includes a bias-compensation circuit 74 and a sense-proof-mass drive circuit 76.

The bias-compensation circuit 74 is configured to determine solutions to one or both of the following equations, or to determine values (e.g., in the form of signals) from which other circuitry can determine solutions to one or both of the following equations:

$$S_1(t) - c \cdot S_3(t) = [-\vec{a}_c(t) = 2(-\vec{V}(t) \times \vec{\Omega}(t)] - M_{1\_Bias}(t) + M_{1\_Bias}(t) = 2(-\vec{V}(t) \times \vec{\Omega}(t)] = -\vec{a}_c(t) \quad (9)$$

$$S_2(t) - d \cdot S_4(t) = [\vec{a}_c(t) = 2(\vec{V}(t) \times \vec{\Omega}(t)] + M_{2\_Bias}(t) - M_{2\_Bias}(t) = 2(-\vec{V}(t) \times \vec{\Omega}(t)) = \vec{a}_c(t) \quad (10)$$

where the second derivative of the sense signal is, for example, $S_1(t)$ or $S_2(t)$, and the second derivative of the compensation signal is, for example, $S_3(t)$ or $S_4(t)$, respectively. For example, where the second derivative of the sense signal is $S_1(t)$ and the second derivative of the compensation signal is $S_3(t)$, the compensation circuit 74 can be configured to determine a solution for only the second integral of $-\vec{a}_c(t)$ per equation (9), and a control circuit (not shown in FIG. 7) can be configured to use only this solution to determine $\vec{\Omega}_z(t)$. Or, where the second derivative of the sense signal is $S_2(t)$ and the second derivative of the compensation signal is $S_4(t)$, the compensation circuit 74 can be configured to determine a solution for only the second integral of $\vec{a}_c(t)$ per equation (10), and the control circuit can be configured to use only this solution to determine $\vec{\Omega}_z(t)$. Alternatively, the compensation circuit 74 can be duplicated, one instance of the compensation circuit for the sense signal (the second derivative of which is $S_1(t)$) derived from the sense proof mass $M_1$ (FIG. 3) and the compensation signal (the second derivative of which is $S_3(t)$) derived from the compensation proof mass $M_3$ (FIG. 3), and another instance of the compensation circuit for the sense signal (the second derivative of which is $S_2(t)$) derived from the sense proof mass $M_2$ (FIG. 3) and the compensation signal (the second derivative of which is $S_4(t)$) derived from the compensation proof mass $M_4$ (FIG. 3), and then a combining circuit, such as an averaging circuit (not shown in FIG. 7), can be included as part of the circuitry 72 and can be configured to calculate $\vec{\Omega}_z(t)$ in response to a combination (e.g., an average) of the results $-a_c(t)$ and $\vec{a}_c(t)$ of equations (9) and (10), respectively.

The bias-compensation circuit 74 includes a compensation path 78 and a sense path 80.

The compensation path 78 includes an amplifier 82 configured to amplify the analog compensation signal from the compensation gyroscope 32, an optional buffer 84, and an analog-to-digital converter (ADC) 86 configured to convert the buffered signal (or the amplified signal if the buffer is omitted) into a digital compensation signal.

The sense path 80 includes an amplifier 88 configured to amplify the analog sense signal with bias error from the sense gyroscope 20, an optional buffer 90, an analog-to-digital converter (ADC) 92 configured to convert the buffered signal (or the amplified signal if the buffer is omitted) into a digital sense signal with bias error, and a mixer 94 to remove, from the sense signal, a carrier component caused by, and at the frequency $F_v$ of, the oscillation $V(t)$ of the sense proof masses $M_1$ and $M_2$ (FIG. 3) in the x (drive) dimension. That is, the mixer 94 is configured to demodulate, or to downshift in frequency, the digital sense signal such that the signal output from the mixer is a baseband signal, the second derivative of which is represented by $S_1(t)$ (equation (9)) or $S_2(t)$ (equation (10)), which represent the Coriolis acceleration and the bias error without the carrier component, which has the frequency $F_v$ at which the sense proof masses $M_1$ and $M_2$ are driven back and forth in the x (drive) dimension. Furthermore, the mixer 94 can be part of a sense processing circuit 96, such as a microcontroller or microprocessor.

Referring to FIGS. 3 and 7, it has been discovered that even though the compensation proof masses $M_3$ and $M_4$ of the compensation gyroscope 32 are not driven in the x (drive) dimension as are the sense proof masses $M_1$ and $M_2$ of the sense gyroscope 20, vibrations can cause each of the compensation signals (the second derivatives of which are represented by $S_3(t)$ and $S_4(t)$ of equations (9) and (10)) to have, effectively, a respective carrier component approximately equal to the sense-proof-mass velocity $V(t)$ at the sense-proof-mass oscillation frequency $F_v$, and a respective modulation component corresponding to $M_{x\_Bias}(t)$ ($-M_{1\_Bias}(t)$ of equation (7) or $M_{2\_Bias}(t)$ of equation (8)) due to the movement of the respective one of the compensation proof masses $M_3$ and $M_4$ in the y (sense) dimension in response to other non-Coriolis-induced vibrations as described above.

Therefore, the compensation path 78 also includes a mixer 98 to remove, from the compensation signal, the carrier component caused by, and at the frequency $F_v$ of, the oscillation $V(t)$ of the sense proof masses $M_1$ and $M_2$ (FIG. 3) in the x (drive) dimension. That is, the mixer 98 demodulates, or frequency downshifts, the compensation signal such that the signal output from the mixer 98 is a signal representing the bias error $M_{x\_Bias}(t)$ ($-M_{1\_Bias}(t)$ of equation (7) or $M_{2\_Bias}(t)$ of equation (8)) without the carrier component $V(t)$ per which the sense proof masses $M_1$ and $M_2$ are driven back and forth in the x dimension. Furthermore, the mixer 98 can be part of a compensation processing circuit 100, such as a microcontroller or microprocessor, or the sense and compensation processing circuits 96 and 100 can be parts of a master processing circuit such as a microprocessor or microcontroller.

The bias-compensation circuit 74 further includes a combiner circuit 102 configured to subtract, from the demodulated sense signal from the sense path 80, the demodulated compensation signal from the compensation path 78 to yield a resulting signal representative of one or both of $-\vec{a}_c(t)$ and $\vec{a}_c(t)$ per equations (9) and (10).

And a control circuit or other circuit (not shown in FIG. 7) is configured to determine $\vec{\Omega}_z(t)$ in response to the resulting signal from the combiner circuit 102.

Still referring to FIGS. 3 and 7, the sense-proof-mass drive circuit 76 is configured to cause the sense proof masses $M_1$ and $M_2$ of the sense gyroscope 20 to oscillate in the x (drive) dimension in a primary resonant mode and approximately 180° out of phase with one another.

The drive circuit 76 includes a sensor (not shown in FIG. 7), such as an electrostatic sensor, configured to "pick up" the x-dimension movement of at least one of the sense proof masses $M_1$ and $M_2$ and to generate an analog proof-mass-movement signal $V(t)$ or $-V(t)$ that represents the "picked-up" x-dimension movement, which is, at least in normal operation, the sinusoidal movement of the at least one of the sense proof masses $M_1$ and $M_2$ while resonating in the x dimension at a resonant frequency $F_v$.

An amplifier 104 is configured to amplify the analog movement signal $V(t)$ or $-V(t)$, an optional buffer 106 is configured to buffer the amplified movement signal, and an ADC 108 is configured to convert the buffered analog signal (or the amplified analog signal if the buffer 106 is omitted) into a digital movement signal.

A phase-locked loop 110 is configured to generate a digital locked signal that has approximately the same phase and the same frequency $F_v$ as the digital movement signal, and to provide the locked signal to the mixers 94 and 98 of the sense path 80 and the compensation path 78, respectively, and to a mixer 112.

The mixer 112 is configured to demodulate or frequency downshift the digital movement signal from the ADC 108 in response to the digital locked signal from the phase-locked loop 110 to generate a digital feedback signal that is representative of the amplitude of the digital movement signal generated by the ADC 108.

A feedback controller, such as a proportional-integral-derivative (PID) feedback controller 114, is configured to cause the amplitude of the digital movement signal, and, therefore, the peak-to-peak amplitude of the displacement of the sense proof masses $M_1$ and $M_2$ in the x dimension (FIG. 3), to have a level specified by a programmed, or an otherwise set, value.

In more detail, the PID controller 114 is configured to generate a digital control signal in response to the digital amplitude signal from the mixer 112.

A digital-to-analog converter (DAC) 116 is configured to convert the digital control signal from the PID controller 114 into an analog control signal.

And an amplifier 118 is configured to amplify the analog control signal from the DAC 116 into an analog drive signal, or an analog drive waveform.

A mass driver, such as an electrostatic or electromagnetic mass driver (not shown in FIG. 7) is configured to drive the sense proof masses $M_1$ and $M_2$ in the x dimension in response to the analog drive waveform from the amplifier 118.

Still referring to FIG. 7, operation of the gyroscope unit 70 is described according to an embodiment in which the sense proof masses $M_1$ and $M_2$ (FIG. 3) oscillate sinusoidally in the x (drive) dimension at a frequency $F_v$, a sensor (not shown in FIG. 7) generates a sense signal in response to movement of the sense proof mass $M_2$ in the y (sense) dimension, and a sensor (not shown in FIG. 7) generates a compensation signal in response to movement of the compensation proof mass $M_4$ (FIG. 3) in the y (sense) dimension.

A sensor (not shown in FIG. 7), such as an electrostatic or capacitive sensor, generates the analog movement signal $V(t)$ in response to the oscillation of the proof mass $M_2$ (FIG. 3) in the x (drive) dimension.

The amplifier 104 amplifies the analog movement signal $V(t)$, and the buffer 106, if present, buffers the amplified analog movement signal $V(t)$.

The ADC 108 converts the buffered analog signal $V(t)$ into a digital movement signal $V(t)$.

The phase-locked loop 110 generates, in response to the digital movement signal $V(t)$, a locked digital signal that is has the approximately the same frequency $F_v$ and phase as the digital movement signal $V(t)$.

The mixer 112 mixes the locked digital signal with the digital movement signal $V(t)$ to generate an amplitude signal that represents the amplitude of $V(t)$, and, therefore, that represents the magnitude of the peak-to-peak displacement of the sense proof mass $M_2$ as it oscillates in the x (drive) dimension.

In response to the amplitude signal, the PID controller 114 generates the control signal to maintain the magnitude of the amplitude signal at a programmed, or otherwise set, value, or to force the amplitude signal toward the set value if the amplitude signal does not equal the set value. For example, if the amplitude represented by the amplitude signal is lower than the set value, then the PID controller 114 adjusts a property (e.g., the magnitude, the phase) of the control signal so as to increase the amplitude represented by the amplitude signal toward the set value. Conversely, if the amplitude represented by the amplitude signal is higher than the set value, then the PID controller 114 adjusts a property (e.g., the magnitude, the phase) of the control signal so as to decrease the amplitude represented by the amplitude signal toward the set value.

The DAC 116 converts the digital control signal to an analog control signal, and the amplifier 118 amplifies the analog control signal to generate the analog drive waveform.

A driver (not shown in FIG. 7), such as an electrostatic or electromagnetic driver, drives the sense proof masses $M_1$ and $M_2$ (FIG. 3) in response to the drive waveform such that the sense proof masses oscillate according to the respective sinusoids $-V(t)$ and $V(t)$ each having a frequency $F_v$ per above.

Still referring to FIG. 7, the electrostatic sensor 54 (FIG. 3) generates the analog compensation signal in response to movement of the sense proof mass $M_2$ in the y (sense) dimension.

The amplifier 82 amplifies the compensation signal with a gain of d per equation (10), and the buffer 84, if present, buffers the amplified compensation signal.

The ADC 86 converts the analog buffered (or amplified if the buffer 84 is omitted) compensation signal into a digital compensation signal.

And the mixer 98 demodulates the digital compensation signal in response to the digital locked signal having the frequency $F_v$ of the movement signal $V(t)$ to generate a digital error signal, the second derivative of which representing the term $d \cdot S_4(t) = M_{2\,Bias}(t)$ of equation (10).

Similarly, the electrostatic sensor 50 (FIG. 3) generates the analog sense signal in response to movement of the sense proof mass $M_2$ in the y (sense) dimension.

The amplifier 88 amplifies the sense signal with a suitable gain, and the buffer 90, if present, buffers the amplified sense signal.

The ADC 92 converts the analog buffered (or the analog amplified if the buffer 90 is omitted) sense signal into a digital sense signal.

And the mixer 94 demodulates the digital sense signal in response to the digital locked signal having the frequency $F_v$ of the movement signal $V(t)$ to generate a digital sense signal, the second derivative of which representing the term $S_2(t) = [\vec{a}_c(t) - 2(\vec{V}(t) \times \vec{\Omega}(t)] + M_{2\,Bias}(t)$ of equation (10).

Next, the summer 102 subtracts the demodulated digital compensation signal (output of the mixer 98) from the demodulated digital sense signal (output of the mixer 94) to generate a signal, the second derivative of which represents the Coriolis acceleration $\vec{a}_c(t)$ per equation (10).

A control circuit (not shown in FIG. 7) determines the value of the angular velocity $\vec{\Omega}_z(t)$ about the sense input axis 46 (FIG. 3) per equation (10) in response to the known values for $V(t)$ and $\vec{a}_c(t)$.

Next, the control circuit (not shown in FIG. 7) or other circuitry takes a suitable action in response to the determined value of the angular velocity $\vec{\Omega}_z(t)$. For example, the control circuit may correct an orientation, about the z axis, of a system that includes the gyroscope unit 70.

A system on which the gyroscope unit 70 is installed can include two more additional gyroscope units configured to determine the angular velocities $\vec{\Omega}_y(t)$ and $\vec{\Omega}_x(t)$ about y and x input axes, respectively.

Still referring to FIG. 7, alternate embodiments of the gyroscope unit 70 are contemplated. For example, the path location at which the bias-compensation circuit 74 subtracts the compensation signal from the sense signal can be other than after the sense and compensation mixers 94 and 98. In an embodiment, instead of including a compensation path 78 and a sense path 80, the bias-compensation circuit 74 includes a single path having, at the front of the path, a summing amplifier configured to receive, from at least two of the sensors 48, 50, 52, and 54 (FIG. 3), the sense signal and the compensation signal, and configured to subtract the compensation signal from the sense signal; the remainder of the single path can be similar to the paths 78 and 80 after the amplifiers 82 and 88, respectively. Similarly, in another embodiment, a summing buffer in a single path is configured to receive the amplified compensation and sense signals from the amplifiers 82 and 88, to subtract the amplified compensation signal from the amplified sense signal, and to provide the resulting signal to an ADC that is coupled to a mixer, which is configured to generate a signal that represents $-\vec{a}_c(t)$ or $\vec{a}_c(t)$ per equation (9) or (10), respectively. In yet another embodiment, the summer 102 can be configured to subtract the digital compensation signal output by the ADC 86 from the digital sense signal output by the ADC 92, and to provide the signal resulting from this subtraction to one of the mixers 94 and 98 (the unused mixer can be omitted); the single output from this mixer represents, for example, $\vec{a}_c(t)$, and is provided to the control circuit (not shown in FIG. 7) configured to calculate $\vec{\Omega}_z(t)$. In still another embodiment, the mixers 94 and 98 may receive, as demodulating or downshifting signals, the signal output by the ADC 108. Furthermore, the sense and compensation processing circuits 96 and 100 may be part of a single processing circuit, or the functions attributed to the sense and compensation processing circuits per above may be performed by the control circuit (not shown in FIG. 7) that is configured to determine $\vec{\Omega}_z(t)$. Moreover, the phase-locked loop 110 may be configured to lock the phase and frequency of the drive waveform to the phase and frequency of the movement signal. In addition, the ratio of the total gain of the compensation path 78 to the sense path 88 can be approximately equal to the scalar factor c or d in equations (9) and (10), respectively. Furthermore, the ratio of the total complex frequency response of the compensation path 78 to the sense path 88 can be approximately equal to the factor c or d in equations (9) and (10), respectively, where the factor c or d is a complex, not a scalar, factor. Moreover, a single compensation gyroscope 32 can be used to generate a compensation signal for multiple sense gyroscopes 20; for example, the input axis 48 (FIGS. 3-6B) of a single compensation gyroscope 32 can be oriented approximately 45° (or any other respective angle for which the compensation gyro has a sensitivity to a vibration sensed by the sense gyro, which angle need not be the same for each sense gyroscope) relative to the input axes 46 (FIGS. 3-6B) of the sense gyroscopes, and a corresponding scalar or complex value for each c and d (one c and one d per sense gyroscope) can be selected to allow the single compensation gyroscope to generate a compensation signal for use by multiple sense gyroscopes. In addition, embodiments described in conjunction with FIGS. 1-6 and 8 may be applicable to the gyroscope unit 70 of FIG. 7.

Figure 8:
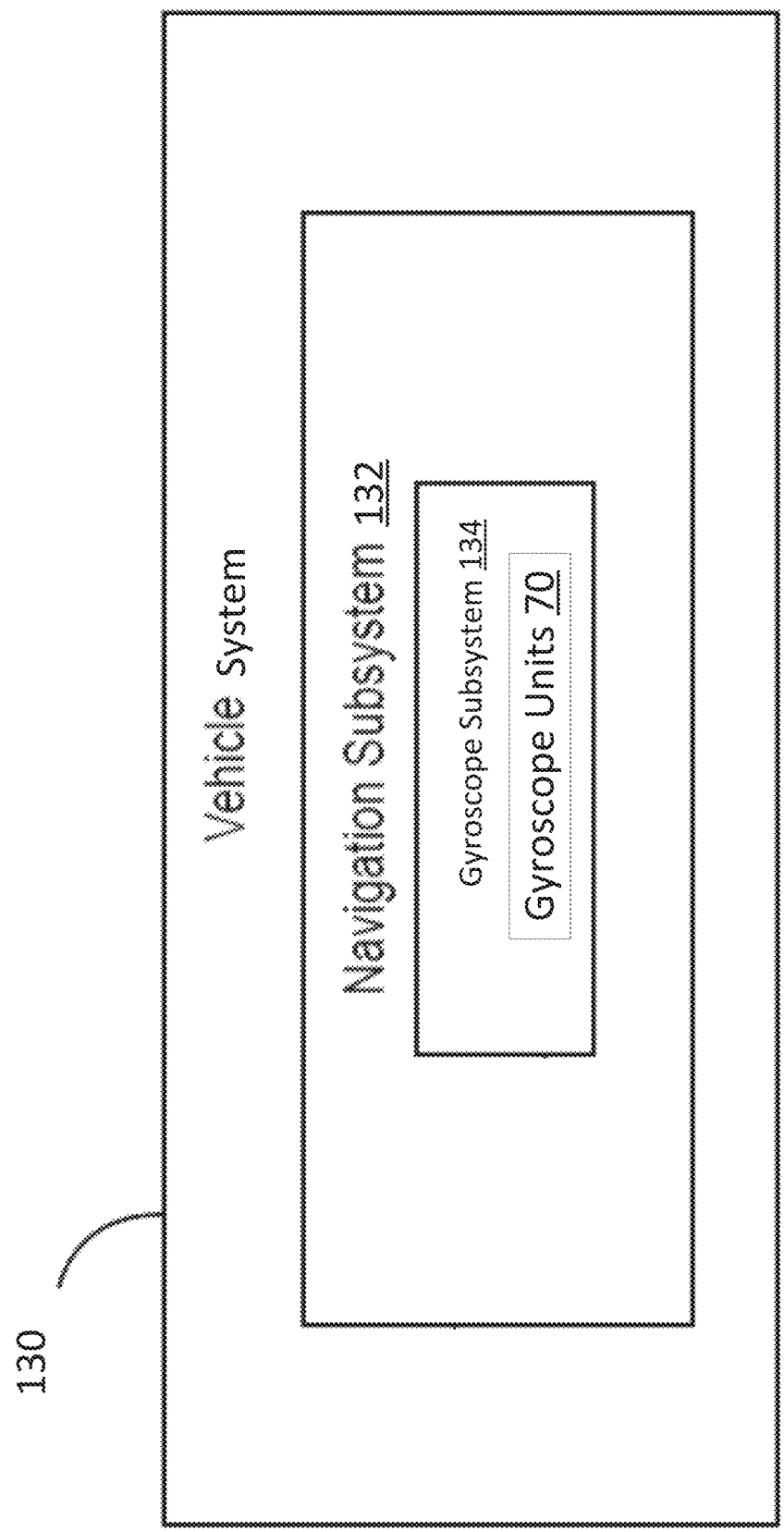
FIG. 8 is a diagram of a system, such as a vehicle or vehicle system, that includes a subsystem, such as a navigation subsystem, having at least one of the gyroscope unit of FIG. 7, according to an embodiment.

FIG. 8 is a diagram of a system 130, which can include one or more gyroscope units 70 of FIG. 7, according to an embodiment.

The system 130 may be a vehicle such as a water craft, aircraft, space craft, or land craft, and may be configured to be manned or to be unmanned.

The vehicle system 130 includes a navigation subsystem 132 configured to control one or more aspects of movement, such as a trajectory, of the vehicle system, such aspects including, e.g., heading, speed, altitude, and depth.

And the navigation subsystem 132 includes a gyroscope subsystem 134, which includes, e.g., three gyroscope units 70, one for each coordinate axis x, y, and z of the system 130.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

EXAMPLE EMBODIMENTS

Example 1 includes a gyroscope assembly comprising: a first sense proof mass having a first sense frequency response in a sense dimension and configured to move in a drive dimension in response to a drive signal, and to move in the sense dimension in response to experiencing an angular velocity about a sense input axis while moving in the drive dimension; and a first compensation proof mass having, in the sense dimension, a first compensation frequency response that is related to the first sense frequency response.

Example 2 includes the gyroscope assembly of Example 1, wherein the first sense proof mass and the first compensation proof mass have approximately a same mass.

Example 3 includes the gyroscope assembly of any of Examples 1-2, wherein the first sense proof mass is configured to oscillate in the drive dimension in response to the drive signal.

Example 4 includes the gyroscope assembly of any of Examples 1-3, wherein the first sense proof mass is configured to resonate in the drive dimension in response to the drive signal.

Example 5 includes the gyroscope assembly of any of Examples 1-4, wherein the compensation frequency response is related to the sense frequency response by a scalar factor, a phase factor, or a complex factor.

Example 6 includes the gyroscope assembly of any of Examples 1-5, wherein the first compensation proof mass is associated with a compensation input axis that is approximately parallel to the sense input axis.

Example 7 includes the gyroscope assembly of any of Examples 1-6, wherein the first compensation proof mass is associated with a compensation input axis that is approximately collinear with the sense input axis.

Example 8 includes the gyroscope assembly of any of Examples 1-7, wherein the first sense proof mass and the first compensation proof mass lie in respective planes that are approximately parallel to the sense input axis.

Example 9 includes the gyroscope assembly of any of Examples 1-8, wherein the first sense proof mass and the first compensation proof mass lie in respective planes that are approximately perpendicular to the sense input axis.

Example 10 includes the gyroscope assembly of Example 1, further comprising: a second sense proof mass having a second sense frequency response in the sense dimension and configured to move in the drive dimension in response to the drive signal, and to move in the sense dimension in response to experiencing an angular velocity about the sense input axis while moving in the drive dimension; and a second compensation proof mass having, in the sense dimension, a second compensation frequency response that is related to the second sense frequency response.

Example 11 includes a gyroscope unit, comprising: a first sense proof mass having a first sense frequency response in a sense dimension and configured to move in a drive dimension in response to a drive signal, and to move in the sense dimension in response to experiencing an angular velocity about a sense input axis while moving in the drive dimension; a first compensation proof mass having, in the sense dimension, a first compensation frequency response that is related to the first sense frequency response; and a circuit configured to generate the drive signal, to generate a first sense signal in response to movement of the first sense proof mass in the sense dimension, to generate a first compensation signal in response to movement of the first compensation proof mass in the sense dimension, and to generate, in response to the first sense signal and the first compensation signal, a resulting signal that is related to the angular velocity.

Example 12 includes the gyroscope unit of Example 11, wherein the circuit is configured to generate the resulting signal in response to a difference between the first sense signal and the first compensation signal.

Example 13 includes the gyroscope unit of any of Examples 11-12, wherein the circuit is configured: to generate a movement signal in response to movement of the first sense proof mass in the drive dimension; to downshift, in frequency, the first sense signal and the first compensation signal in response to the movement signal; and to generate the resulting signal in response to a difference between the downshifted first sense signal and the downshifted first compensation signal.

Example 14 includes the gyroscope unit of any of Examples 11-13, wherein the circuit is configured: to generate an intermediate signal in response to a difference between the first sense signal and the first compensation signal; to generate a movement signal in response to movement of the first sense proof mass in the drive dimension; to downshift, in frequency, the intermediate signal in response to the movement signal; and to generate the resulting signal in response to the intermediate signal.

Example 15 includes the gyroscope unit of any of Examples 11-14, wherein the circuit is configured: to generate an intermediate signal in response to a difference between the first sense signal and the first compensation signal; to generate a movement signal in response to movement of the first sense proof mass in the drive dimension;

and to generate the resulting signal by downshifting, in frequency, the intermediate signal in response to the movement signal.

Example 16 includes the gyroscope unit of Examples 11-15, further comprising: a second sense proof mass having a second sense frequency response in the sense dimension and configured to move in the drive dimension in response to the drive signal, and to move in the sense dimension in response to experiencing an angular velocity about the sense input axis while moving in the drive dimension; a second compensation proof mass having, in the sense dimension, a second compensation frequency response that is related to the second sense frequency response; and wherein the circuit is configured to generate a second sense signal in response to movement of the second sense proof mass in the sense dimension, to generate a second compensation signal in response to movement of the second compensation proof mass in the sense dimension, and to generate, in response to the first and second sense signals and the first and second compensation signals, the resulting signal.

Example 17 includes a method, comprising: generating a sense signal in response to a sense proof mass simultaneously moving in a sense dimension and in another dimension approximately perpendicular to the sense dimension; generating a compensation signal in response to a compensation proof mass moving in the sense dimension; and generating, in response to the sense signal and the compensation signal, a resulting signal that is related to an angular velocity about an input axis.

Example 18 includes the method of Example 17, further comprising: driving the sense proof mass in the dimension at a frequency; and reducing, in the resulting signal, a magnitude of a signal component at the frequency.

Example 19 includes the method of any of Examples 17-18, further comprising: driving the sense proof mass in the dimension at a frequency; reducing, in each of the sense signal and the compensation signal, a magnitude of a respective signal component at the frequency.

Example 20 includes the method of any of Examples 17-19, wherein the sense proof mass and the compensation proof mass have approximately equal frequency responses in the sense dimension.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A gyroscope assembly, comprising:
a first sense proof mass having a first sense frequency response in a sense dimension and configured
to move in a drive dimension in response to a drive signal, and
to move in the sense dimension in response to experiencing an angular velocity about a sense input axis while moving in the drive dimension;
a first compensation proof mass having, in the sense dimension, a first compensation frequency response that is related to the first sense frequency response, wherein the first compensation proof mass is not driven in the drive dimension; and
one or more circuits configured to:
generate a sense signal in response to the first sense proof mass simultaneously moving in the sense dimension and in the drive dimension;
generate a compensation signal in response to a compensation proof mass moving in the sense dimension; and
generate, in response to the sense signal and the compensation signal, a resulting signal that is related to the angular velocity about the sense input axis.

2. The gyroscope assembly of claim 1, wherein the first sense proof mass and the first compensation proof mass have approximately a same mass.

3. The gyroscope assembly of claim 1, wherein the first sense proof mass is configured to oscillate in the drive dimension in response to the drive signal.

4. The gyroscope assembly of claim 1, wherein the first sense proof mass is configured to resonate in the drive dimension in response to the drive signal.

5. The gyroscope assembly of claim 1, wherein the first compensation frequency response is related to the first sense frequency response by a scalar factor, a phase factor, or a complex factor.

6. The gyroscope assembly of claim 1, wherein the first compensation proof mass is associated with a compensation input axis that is approximately parallel to the sense input axis.

7. The gyroscope assembly of claim 1, wherein the first compensation proof mass is associated with a compensation input axis that is approximately collinear with the sense input axis.

8. The gyroscope assembly of claim 1, wherein the first sense proof mass and the first compensation proof mass lie in respective planes that are approximately parallel to the sense input axis.

9. The gyroscope assembly of claim 1, wherein the first sense proof mass and the first compensation proof mass lie in respective planes that are approximately perpendicular to the sense input axis.

10. The gyroscope assembly of claim 1, further comprising:
a second sense proof mass having a second sense frequency response in the sense dimension and configured
to move in the drive dimension in response to the drive signal, and
to move in the sense dimension in response to experiencing an angular velocity about the sense input axis while moving in the drive dimension; and
a second compensation proof mass having, in the sense dimension, a second compensation frequency response that is related to the second sense frequency response.

11. A gyroscope unit, comprising:
a first sense proof mass having a first sense frequency response in a sense dimension and configured
to move in a drive dimension in response to a drive signal, and
to move in the sense dimension in response to experiencing an angular velocity about a sense input axis while moving in the drive dimension;
a first compensation proof mass having, in the sense dimension, a first compensation frequency response that is related to the first sense frequency response, wherein the first compensation proof mass is not driven in the drive dimension; and
a circuit configured
to generate the drive signal,
to generate a first sense signal in response to movement of the first sense proof mass in the sense dimension, to generate a first compensation signal in response to movement of the first compensation proof mass in the sense dimension, and to generate, in response to the first sense signal and the first compensation signal, a resulting signal that is related to the angular velocity.

12. The gyroscope unit of claim 11, wherein the circuit is configured to generate the resulting signal in response to a difference between the first sense signal and the first compensation signal.

13. The gyroscope unit of claim 11, wherein the circuit is configured:

to generate a movement signal in response to movement of the first sense proof mass in the drive dimension;

to downshift, in frequency, the first sense signal and the first compensation signal in response to the movement signal; and to generate the resulting signal in response to a difference between the downshifted first sense signal and the downshifted first compensation signal.

14. The gyroscope unit of claim 11, wherein the circuit is configured:

to generate an intermediate signal in response to a difference between the first sense signal and the first compensation signal;

to generate a movement signal in response to movement of the first sense proof mass in the drive dimension;

to downshift, in frequency, the intermediate signal in response to the movement signal; and to generate the resulting signal in response to the intermediate signal.

15. The gyroscope unit of claim 11, wherein the circuit is configured:

to generate an intermediate signal in response to a difference between the first sense signal and the first compensation signal;

to generate a movement signal in response to movement of the first sense proof mass in the drive dimension; and to generate the resulting signal by downshifting, in frequency, the intermediate signal in response to the movement signal.

16. The gyroscope unit of claim 11, further comprising:

a second sense proof mass having a second sense frequency response in the sense dimension and configured to move in the drive dimension in response to the drive signal, and to move in the sense dimension in response to experiencing an angular velocity about the sense input axis while moving in the drive dimension;

a second compensation proof mass having, in the sense dimension, a second compensation frequency response that is related to the second sense frequency response; and wherein the circuit is configured to generate a second sense signal in response to movement of the second sense proof mass in the sense dimension, to generate a second compensation signal in response to movement of the second compensation proof mass in the sense dimension, and to generate, in response to the first and second sense signals and the first and second compensation signals, the resulting signal.

* * * * *